United States Patent
Truong et al.

(10) Patent No.: US 9,371,956 B2
(45) Date of Patent: Jun. 21, 2016

(54) DISPLAY STAND

(71) Applicant: Lenovo (Singapore) Pte. Ltd., New Tech Park (SG)

(72) Inventors: Cuong Huy Truong, Cary, NC (US); David Wayne Hill, Cary, NC (US); John David Swansey, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/546,160

(22) Filed: Nov. 18, 2014

(65) Prior Publication Data

US 2016/0138752 A1    May 19, 2016

(51) Int. Cl.
| | |
|---|---|
| *F16M 11/00* | (2006.01) |
| *F16M 11/10* | (2006.01) |
| *F16M 11/22* | (2006.01) |
| *F16L 3/12* | (2006.01) |
| *G06F 1/16* | (2006.01) |

(52) U.S. Cl.
CPC *F16M 11/10* (2013.01); *F16L 3/12* (2013.01); *F16M 11/22* (2013.01); *G06F 1/16* (2013.01)

(58) Field of Classification Search
USPC .............. 248/917, 922, 923, 127, 371, 398; 361/679.22
See application file for complete search history.

(56) References Cited

U.S. PATENT DOCUMENTS

| | | | | |
|---|---|---|---|---|
| 7,088,577 B2* | 8/2006 | Lauffer | ................. | G06F 1/1601 361/679.21 |
| 7,389,963 B2* | 6/2008 | Cho | ...................... | F16M 11/26 248/159 |
| 7,692,815 B2* | 4/2010 | Silverbrook | ............... | B41J 2/01 347/101 |
| 7,946,542 B1* | 5/2011 | Chapman | ............ | B60R 11/0252 248/122.1 |
| 8,625,304 B2* | 1/2014 | Shen | .................... | F16M 11/046 248/122.1 |
| 2007/0152125 A1* | 7/2007 | Lee | ........................ | F16M 11/04 248/398 |
| 2009/0140109 A1* | 6/2009 | Watson | .................. | F16M 11/42 248/176.1 |
| 2010/0096525 A1* | 4/2010 | Yu | .......................... | F16M 11/10 248/229.2 |
| 2015/0176826 A1* | 6/2015 | Chien | ..................... | F21S 8/035 362/253 |

* cited by examiner

*Primary Examiner* — Steven Marsh
(74) *Attorney, Agent, or Firm* — John L. Rogitz; John M. Rogitz (57) ABSTRACT

In one aspect, an apparatus includes a base supportable on a surface, a support rod having a long segment extending upwardly from the base and a short segment extending laterally away from the long segment and terminating at a free end. The long segment is longer than the short segment. The apparatus also includes a coupling located at the free end of the short segment which is configured to couple the short segment to a computer chassis to establish a clearance space between the short segment, long segment, and chassis to facilitate access to at least one electrical terminal on the chassis below the coupling.

19 Claims, 9 Drawing Sheets

DISPLAY STAND

FIELD

The present application relates generally to display stands.

BACKGROUND

Current display stands can be relatively expensive to produce and can also be undesirably bulky. Furthermore, it is often relatively difficult to hide from view USB cables connected to USB ports on a display device which is connected to a display stand.

SUMMARY

Accordingly, in one aspect a stand includes a base supportable on a surface, a support rod having a long segment extending upwardly from the base and a short segment extending laterally away from the long segment and terminating at a free end. The long segment is longer than the short segment. The apparatus also includes a coupling located at the free end of the short segment which is configured to couple the short segment to a computer chassis to establish a clearance space between the short segment, long segment, and chassis to facilitate access to at least one electrical terminal on the chassis below the coupling.

In another aspect, an apparatus includes a base and an arm coupled to a face of the base. The arm is coupled to the face to protrude outwardly therefrom at a first oblique angle relative to the face. The arm includes a first segment which is elongated and defined at opposing ends by a first end coupled to the base and a second end at which the arm bends a second oblique angle relative to the first segment. The arm also includes a second segment defined at opposing ends by the second end and a third segment which is coupled to the second segment. The third segment establishes a first axis which is at least substantially orthogonal to a second axis established by the second segment, and is structured for coupling to a display device.

In still anther aspect, a method includes providing a base for a display stand and providing an arm emanating from the base which is structured to connect to a back of a display device above a portion of the back of the display device at which at least one port is located. The arm is structured to avoid blocking a connector from being engaged with the port when the arm is connected to the back of the display device.

The details of present principles, both as to their structure and operation, can best be understood in reference to the accompanying drawings, in which like reference numerals refer to like parts, and in which:

DETAILED DESCRIPTION

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such us desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such us Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by moans of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various subroutines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
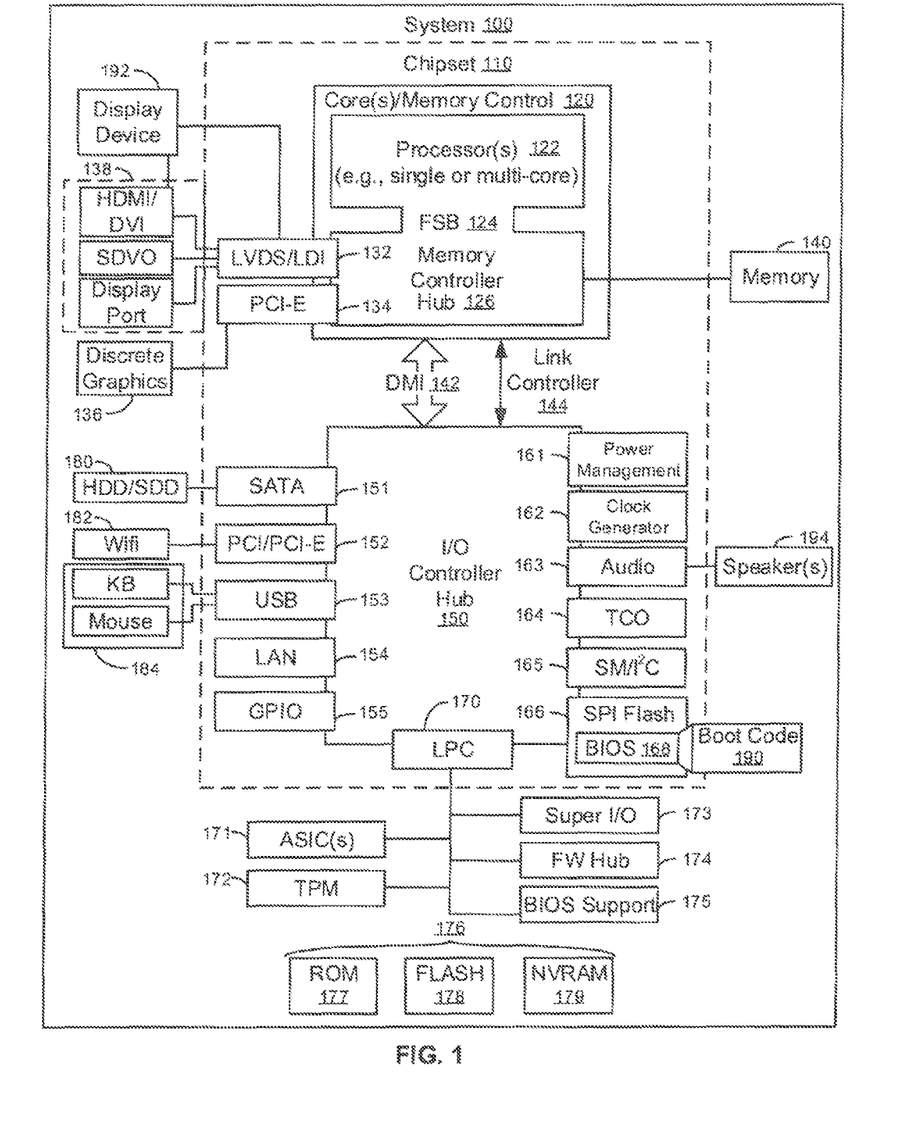
FIG. 1 is a block diagram of an example system in accordance with present principles.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interlace (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for un external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though now shown for clarity, in some embodiments the system 100 may include a gyroscope for e.g. sensing and/or measuring the orientation of the system 100 and providing input related thereto to the processor 122, an accelerometer for e.g. sensing acceleration and/or movement of the system 100 and providing input related thereto to the processor 122, an audio receiver/microphone providing input to the processor 122 e.g. based on a user providing audible input to the microphone, and a camera for gathering one or more images and providing input related thereto to the processor 122. The camera may be, e.g., a thermal imaging camera, a digital camera such as a webcam, and/or a camera integrated into the system 100 and controllable by the processor 122 to gather pictures/images and/or video. Still further, and also not shown for clarity, the system 100 may include a GPS transceiver that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
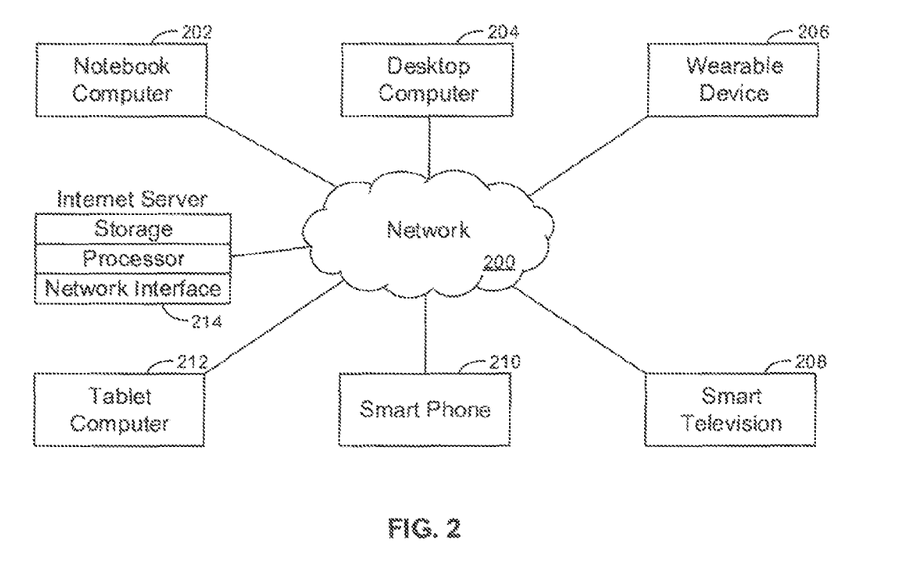
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
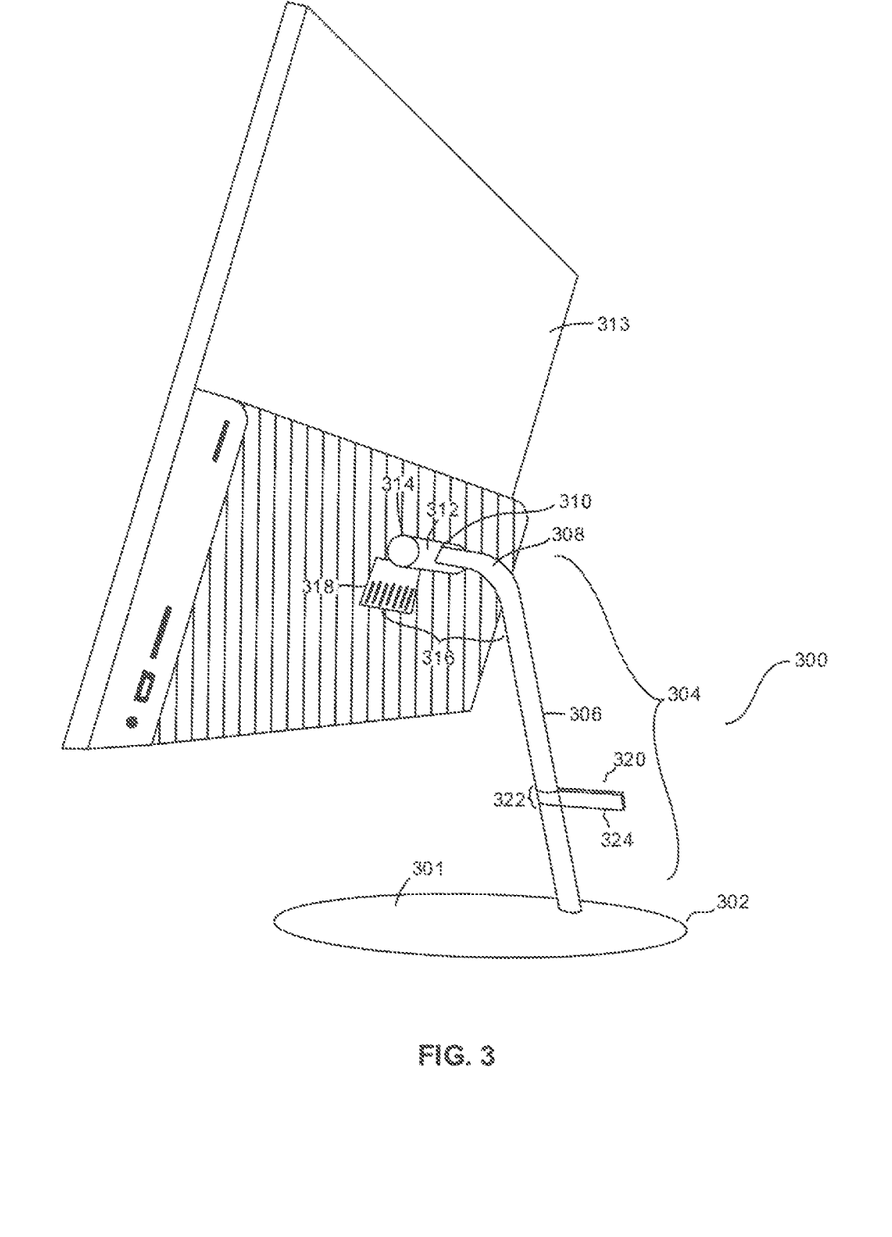
FIGS. 3 and 4 are perspective views of an example display stand and example display device in accordance with present principles.
Figure 4:
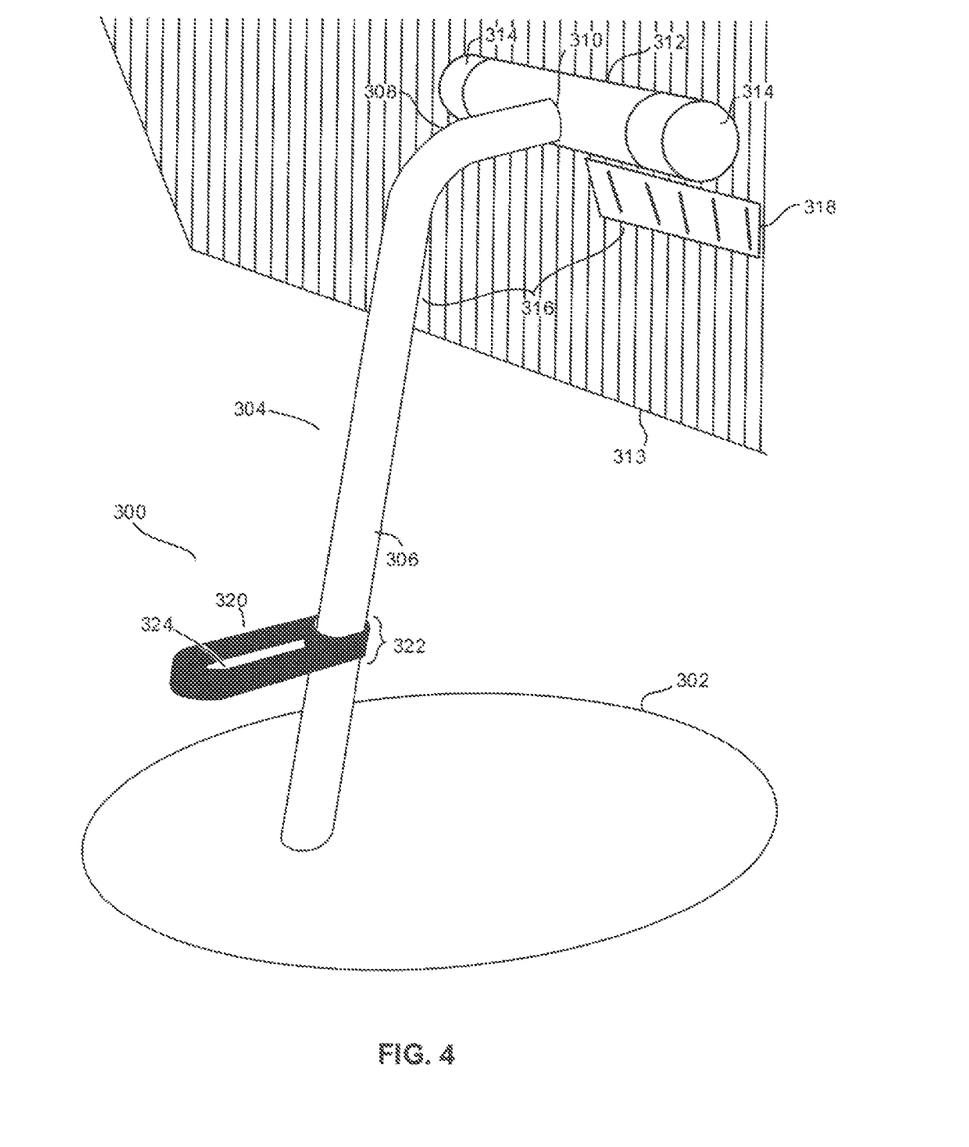

In cross-reference to FIGS. 3 and 4, they show perspective views of a display stand 300 in accordance with present principles. The stand 300 includes a base 302 supportable on a surface such as e.g. a horizontal surface. The stand 300 also includes a support rod and/or arm 304 having a long segment 306 coupled at one end to and/or extending upwardly from an upper planar surface (e.g. face) 301 of the base 302 e.g. at an oblique angle relative to a plane established by a portion of the base 302 such as the surface 301 and/or relative to a plane established by the surface on which the stand 300 is supportable. Note that although not shown for clarity, the base 302 also comprises a lower and/or bottom planar surface opposite the surface 301 for placement on the surface mentioned above.

The rod 304 also includes a short segment 308 at a second end of the long segment 306 that bends at an oblique angle relative to an axis established by the long segment 306, and/or that extends laterally away from the long segment 306. The short segment 308 terminates at an end 310 at which another segment and/or coupling element 312 is disposed and/or coupled thereto. It is to be understood that the long segment 306 is longer than the short segment 308. It is to also be understood that in some non-limiting embodiments, the segment and/or coupling element 312 may establish a longitudinal axis that is at least substantially orthogonal if not orthogonal to a longitudinal axis established by the short segment 308.

Furthermore, it is to be understood that the segment 312 may be configured for coupling the rod 304 to a display device 313 at at least one reciprocal coupling element 314 on the display device 313 and/or coupled thereto. In some embodiments, the coupling element 314 may be coupled to a chassis and/or frame of the display device 313. It is to be understood that in some embodiments, the segment 312 is configured for engagement with the at least one element 314 for rotation of the display device 313 about an axis of rotation at least parallel to the longitudinal axis of the segment 312 if not established by the longitudinal axis of the segment 312.

As maybe appreciated from both FIGS. 3 and 4, when the segment and/or coupling element 312 is coupled to the coupling element 314 of the display device 313, a clearance space (e.g. unobstructed area and/or free space) 316 is established between the short segment 308, long segment 306, and chassis of the display device 313 (e.g. at least a nearest portion (e.g. of the back) of the display device 313 to the end long segment 306 at which to the short segment 308 is located) to facilitate access to at least one electrical terminal 318 on the back of the display device 313 (e.g. where the front comprises a display for presenting images under control of a processor) below the location at which the segment 312 couples to the display device 313 relative to the stand 300 being positioned upright on a surface when engaged with the display device 313.

Figure 5:
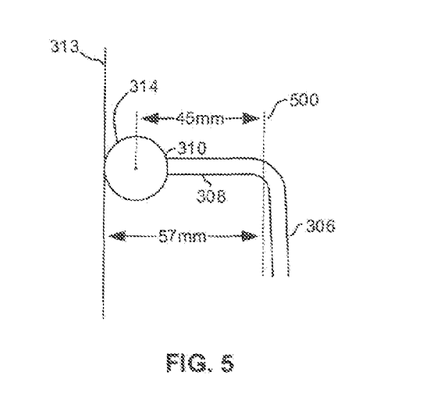
FIG. 5 is a side elevational view of an example display stand and example display device in accordance with present principles.

It may thus be appreciated that the rod 304 is structured to avoid blocking a connector and/or plug from being engaged with the at least one electrical terminal 318 when the rod 304 is connected to a back portion of the display device 313. In example embodiments, the distance between the nearest portion of the display device 313 to the end of the long segment 306 at which the short segment 308 is disposed when the stand 300 is engaged with the display device 313 may be e.g. fifty five millimeters to sixty nine millimeters, and in some example embodiments may specifically be fifty seven millimeters. The side elevational view of FIG. 5, with portions cut away for clarity, shows such an example embodiment where the clearance space is fifty seven millimeters between a closest portion of the back of the display device 313 to the end of the segment 306 at which the segment 308 begins as represented by perforated line 500, while the distance between a center (e.g. established by a longitudinal axis) of the segments 312 and/or 314 to a nearest portion of the segment 306 (e.g. such as the end of the segment 306) is preferably forty five millimeters.

Describing the at least one and optionally plural electrical terminals 318, they may be e.g. universal serial bus (USB) ports, high definition multimedia interface (HDMI) ports, digital visual interface (DVI) ports, display ports, E-Sata ports, IEEE 1394 interface (e.g. FireWire) ports, PS/2 ports, serial ports, VGA ports, SCSI ports, and/or audio ports, etc. Furthermore, it may be appreciated from FIGS. 3 and 4 that in example embodiments, the at least one terminal 318 is preferably located at least substantially midway between left and right edges of the back of the display device 313 (e.g. midway along a dimension of the back of the display device 313 established by the width of the display device 313 itself).

Still in reference to FIGS. 3 and 4, in some embodiments the stand 300 may include a wire and/or cord guide 320 (which may be e.g. a least partially oval in shape) engaged with the long segment 306. The guide 320 may form an enclosure through which at least one wire and/or cord from the display device (e.g. connected at one of the electrical terminals) can be fed to hold a portion of the wire and/or cord within the enclosure established by the guide 320.

Furthermore, in some embodiments the guide 320 may be engaged in an interference fit with the long segment 306 and/or be slidably disposed on the long segment 306. Thus, it is to be understood that in some embodiments the guide 320 may include an engagement socket 322 configured to closely receive the long segment 306 in an interference fit, in addition to an enclosure portion 324 establishing the enclosure. As may be best appreciated from FIG. 4, the enclosure is elongated and/or at least partially oval-shaped in a horizontal dimension when the base 302 is disposed flat on a surface. Also, note that the enclosure may in the example embodiment shown be completely enclosed in that a wire or cord once fed through the enclosure cannot pass laterally through the enclosure portion 324. Notwithstanding, in other embodiments the enclosure portion 324 may have a slider, door, and/or latch which may transition between open and closed configurations to allow a wire or cord to laterally pass there through, while in still other embodiments the enclosure portion 324 may have a gap through which a wire or cord may laterally pass.

Before moving on in the detailed description to other figures, it may be appreciated from FIGS. 3 and 4 that in some example embodiments, the rod 304 may be unitarily made and/or integral with at least the segments 306 and 308 unitarily made, and the segments 308 and 312 unitarily made. As may also be appreciated from FIGS. 3 and 4, the segments 306, 308, and 312 may be cylindrical in shape with at least e.g. the segments 306 and 308 (and optionally also the segment 312) establishing cylindrical segments of the same diameter and/or circumference. The diameter of the segments 306 and 308 (and also in some embodiments the segment 312) may be in the range of nine millimeters to eleven millimeters, and specifically it may be ten millimeters in example embodiments. Furthermore, note that the segments 306, 308, and 312 may be at least partially hollow in example embodiments. What's more, in some embodiments at least one and optionally each of the segments 306, 308, and 312 may be made at least partially of a metal such as e.g. stainless steel, polished aluminum, etc. Also note that as shown, the base 302 may be cylindrical as established at least partially by the upper planar surface 301 and the lower planar surface (not shown) described above.

Figure 6:
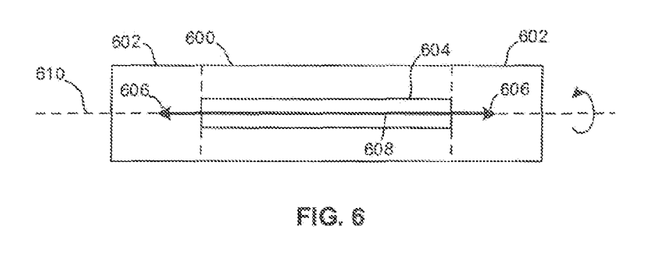
FIGS. 6 and 8 are side cross-sectional views of example coupling elements in accordance with present principles.
Figure 7:
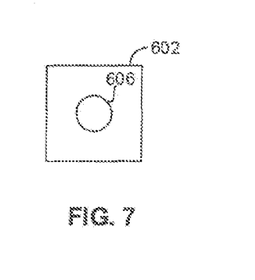
FIGS. 7 and 9 are transverse cross-sectional views of example coupling elements in accordance with present principles.

Continuing the detailed description in cross-reference to FIGS. 6 and 7, FIG. 6 is a side cross-sectional view of an example embodiment of reciprocal coupling elements, such as the segments 312 and 314 described above, coupled together to thus couple a stand to a display device in accordance with present principles, while FIG. 7 is a transverse cross-sectional view of a coupling element for the display device which may be engaged with a coupling element for the stand. Thus, a stand coupling element 600 is shown, along with plural display device coupling elements 602. The element 600 may include a hollow fitting 604 configured to fit between left and right ring mounts 606 on respective elements 602 of the display device. The stand coupling element 600 also includes at least one coupling pin 608 configured to extend at least partially through the ring mounts 606 and hollow fitting 604 to hold the hollow fitting 604 in engagement with the ring mounts 606 to establish a rotatable hinge in accordance with present principles. As may be appreciated from FIG. 6, the elements 600 and 602 may be coupled together to establish the rotatable hinge so that the display device (not shown for clarity) may rotate around an axis of rotation 610 established by the segments 600 and 602, and/or specifically the pin 608, using an interference fit established at least partially based on engagement of the pin 608 with the ring mounts 606 and/or hollow fitting 604.

Figure 8:
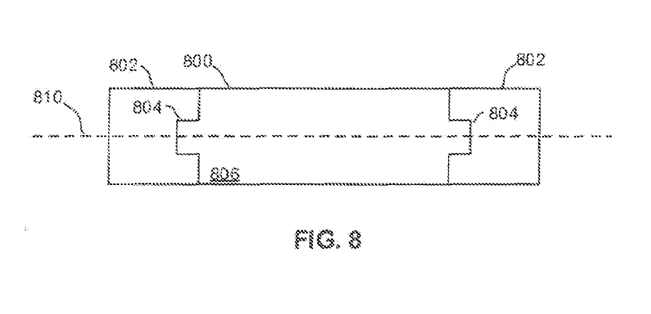
Figure 9:
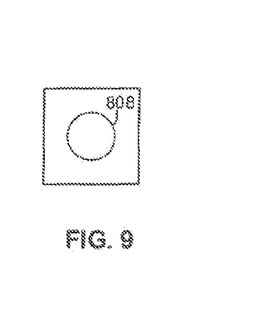

Now in cross-reference to FIGS. 8 and 9, FIG. 8 shows a side cross-sectional view of another example embodiment of reciprocal coupling elements, such as the segments 312 and 314 described above, coupled together to thus couple a stand to a display device in accordance with present principles, while FIG. 9 shows a transverse cross-sectional view of a coupling element for the display device which may be engaged with a coupling element for the stand. In contrast to FIGS. 6 and 7, rather than including a pin as described above, an interference fit embodiment absent a pin is shown in FIGS. 8 and 9.

Accordingly, a stand coupling element 800 is shown, along with plural display device coupling elements 802. Note that the stand coupling element 800 has respective knobs, protrusions, and/or nodules 804 on respective left and right ends of the element 800, which may be cylindrical in shape and extend outward from respective center portions of respective sides of a main body portion 806 of the element 800 into reciprocal holes 808 respectively in the elements 802. As may be appreciated from FIG. 8, the elements 800 and 802 may be coupled together to establish the rotatable hinge so that the display device (not shown for clarity) may rotate around an axis of rotation 810 established by the segments 800 and 802 using an interference fit established at least partially based on engagement of the knobs 804 with the holes 808.

Figure 10:
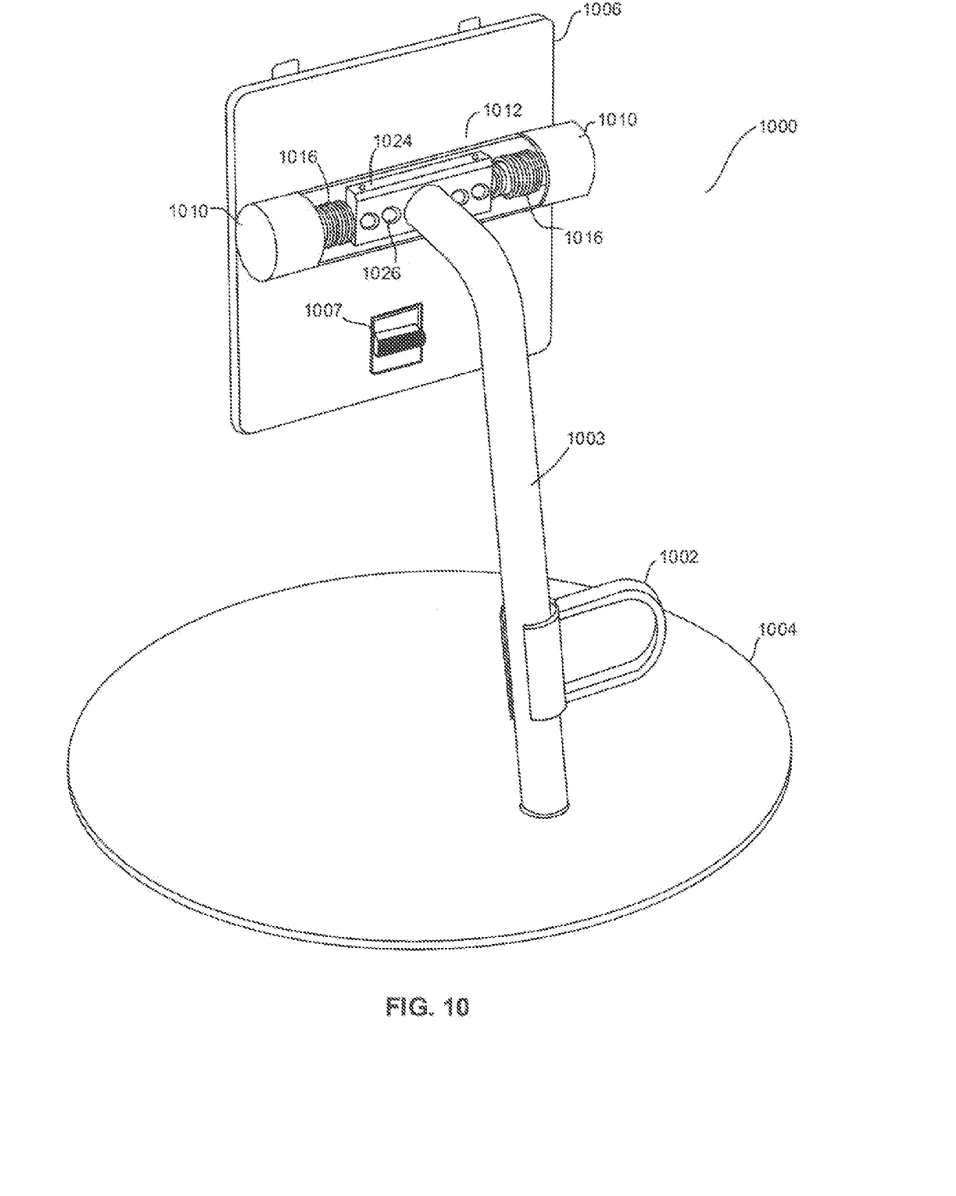
FIGS. 10-13 are perspective views of an example display stand with portions cut away for clarity.

Now in cross-reference to FIGS. 10-13, they are perspective views of an example display stand with portions cut away for clarity. As shown in FIG. 10, note that in this example embodiment a wire guide 1002, that is engaged with a support rod 1003 in accordance with present principles, is elongated and/or at least partially oval-shaped in a vertical dimension when a stand base 1004 is disposed flat on a surface.

Further, FIGS. 10-13 also show a plate 1006 which may in some embodiments form a part of the stand 1000 and e.g. mount to another plate on a display device for engagement therewith, while in other embodiments the plate 1006 may form part of the display device itself, but in either case is understood to be engageable with the display device so that the display device engages with the stand 1000. Also note that as shown, the plate 1006 may include at least one electrical terminal and/or terminal connector or inlet 1007 for connecting a wire with the display device in accordance with present principles.

Figure 11:
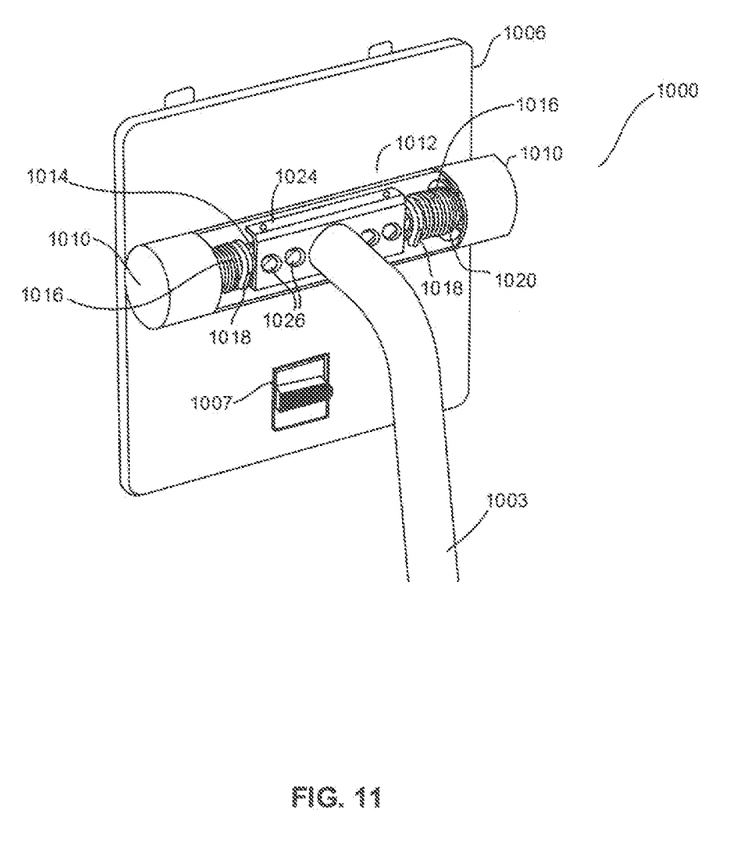
Figure 12:
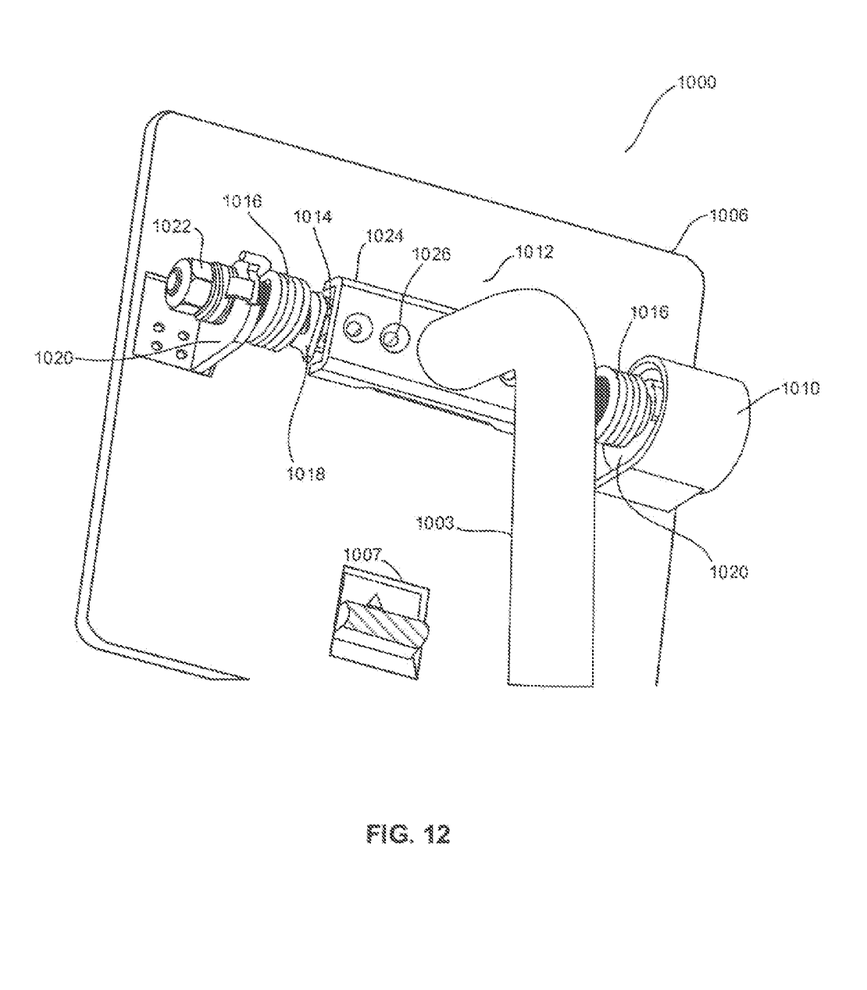
Figure 13:
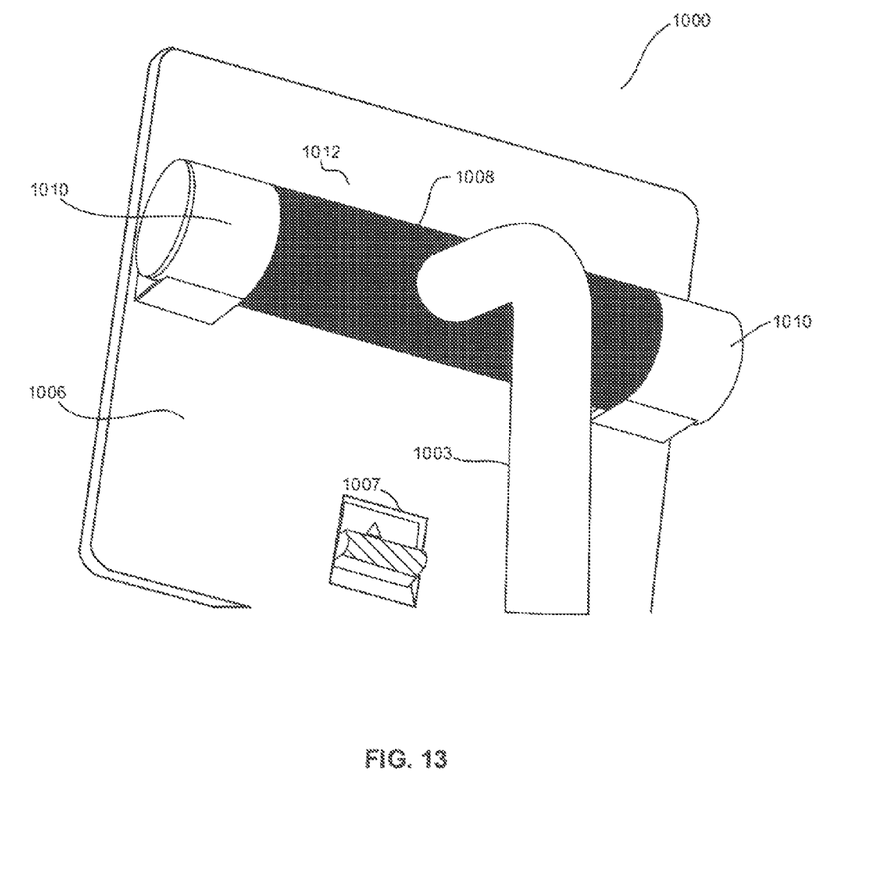

As best shown in FIG. 13, a central hinge cover 1008 and respective end cap covers 1010 cover inner portions of on example hinge 1012, where those inner portions are shown in the cross-sectional views of the hinge 1012 shown in FIGS. 10-12.

As best shown in FIGS. 11 and 12, the hinge 1012 includes a (e.g. cylindrical) metal rod 1014 for rotating portions of the hinge relative to a display device (which is not shown) about an axis of rotation established by the longitudinal axis of the hinge 1012 and/or rod 1014. The metal rod 1014 is coupled to and/or engaged with springs 1016 e.g. in an interference fit. The springs 1016 are coupled at one respective inner end thereof to a respective (e.g. metal) element 1018, the element 1018 itself being coupled to the rod 1014 to remain immobile relative to the rod 1014 during rotation, and respective outer ends of the springs 1016 are coupled to another (e.g. metal) element 1020 (e.g. an arm) which itself is coupled to e.g. a respective cap 1010, plate 1006, and/or another portion of the hinge 1012 that moves relative in the portion of the hinge comprising the rod 1014 and element 1018. Also note that nuts 1022 at respective ends of the rod 1014 engage with the rod 1014 and the elements 1020 to thus restrain the elements 1020 from being removed from engagement with the rod 1014.

Accordingly, under spring bias the plate 1006 and/or elements 1020 may rotate about the axis of rotation (established by e.g. the rod 1014) to thus rotate a display device engaged therewith while the rod 1003, rod 1014, elements 1018, nuts 1022, and/or shield 1024 remain immobile relative to the rotation of the plate 1006 and/or elements 1020.

Note that owing to spring bias caused by the springs 1016, as the plate 1006 is rotated one way or the other about the axis of rotation, bias caused by the springs 1016 may exert a force on the plate 1006 back toward the direction and/or orientation from which the plate 1006 was rotated. Thus, springs that induce a bias small enough to be overcome by the weight of the display device itself when rotated may be used, and thus the spring bias may be overcome to hold the display device coupled to the plate 1006 in place upon rotation to a particular user-defined angle. Notwithstanding, note that in other embodiments which do not include the springs 1016, the elements 1020 may be engaged with the rod 1014 in an interference fit therewith to thus rotate the plate 1006 coupled to the elements 1020 relative to the e.g. rod 1003, rod 1014, elements 1018, nuts 1022, and/or shield 1024.

Describing the shield 1024 in more detail, it may be e.g. a die-cast aluminum part, but in any case engages with and/or couples to the rod 1003 to hold the rod 1003 immobile during rotation. The shield 1024 also includes at least one and optionally plural holes 1026 for respective engagement with screws so that the screws extend through the shield 1024 to engage with the rod 1014 to thus engage the shield 1024 with the rod 1014 and hold it immobile relative to the rod 1014 during rotation.

However, note that in some embodiments, the shield 1024 may not be present, and in such embodiments the rod 1003 may be coupled directly to the rod 1014. Further, in still other embodiments the shield 1024 may be integral with the rod 1014.

Without reference to any particular figure, it is to be understood that in addition to an interference fit e.g. between a hollow fitting of a coupling and ring mounts on a computer chassis and/or display chassis, other similar structures may be employed to permit the computer and/or display chassis to be rotated by hand about its horizontal axis while maintaining the chassis in a fixed orientation with respect to the stand when hand pressure is removed. For example, one of the coupling or mount rings may be formed with small sockets or detents to receive a small protrusion or ball on the other of the coupling or ring mount. Still further, in some embodiments a computer and/or display chassis may be rotated with respect to a display stand e.g. using an electric motor for the coupling elements which under control of a computer processor and/or based on user input may rotate the computer and/or display chassis relative to the stand.

Also without reference to any particular figure, it is to be understood that a support rod for a display stand in accordance with present principles may in some embodiments have segments thereof integrally made with each other, and also in some embodiments the base of such a stand may also be integrally made with the support rod (e.g. all shaped out of a unitary piece of metal).

Still further, it is to be understood that in some embodiments while the angle of one segment of a support rod with respect to another segment, and/or angle of the long segment of a support rod with respect to the base of the display stand, may be oblique, in other embodiments one or more of these angles may be orthogonal. Notwithstanding, when oblique, an angle may be e.g. within the range of e.g. seventy five degrees to orthogonal and/or from orthogonal to one hundred five degrees.

Still without reference to any particular figure, it is to be understood that in some embodiments, a display device in accordance with present principles may be an all-in-one device in that, in addition to including a display, may include e.g. some or all of the components discussed above with respect to the system 100. E.g., a processor, storage medium (e.g. hard disk drive), compact disc (CD) drive, network interface, etc. may also be included in such an all-in-one display device, along with e.g. one or more operating systems including a host operating system and guest operating system.

Also, note that one or more of the electrical terminals and/or ports described above may be oriented for engagement with a connector (e.g. of a USB cable) such that the connector connects when oriented along a horizontal plane orthogonal to a plane established by a top to bottom dimension of the display device and/or orthogonal to a plane established by a top to bottom dimension of a display of the display device (e.g. a touch-enabled display on which images may be presented under control of a processor). Notwithstanding, in other embodiments some or all of the electrical terminals and/or ports may be oriented for engagement with a connector such that the connector connects when oriented along a plane oblique to one of the top to bottom dimensions described immediately above (e.g., pointed downward toward a bottom dimension of the display device).

In any case, electrical terminals in accordance with present principles may be positioned on the back of a display device e.g. at least substantially in the middle of the display device with respect to a left to right dimension of the display device when placed upright, with a display stand coupled thereto, on a surface so that e.g. they may be lined up left to right at and/or emanating out from the middle to the left and/or to the right (e.g. with respective sets of electrical terminals to the left and to the right of center and/or emanating therefrom being equidistant to the middle). Also note that in some embodiments, in addition to or in lieu of plural electrical terminals being oriented in the middle of the back of the display device with respect to a left to right dimension, they may be oriented vertically at and/or near a middle of a top to bottom dimension of the display device.

It may now be appreciated that present principles provide a thin support bar (e.g. a rod) between a base and an e.g. all-in-one computer (AIO) to hold and support the AIO in a standing position. Thus, in example embodiments a user is given relatively easy access to backside connectors that are e.g. at a horizontal center of the display device and facing outward from the rear (e.g. while also not being able to see most of the cables as they protrude therefrom when looking at the front of the display). Cables may thus be connected while still leaving room, owing at least partially to clearance space established by the display stand configuration when coupled to the display device, and then the cables may be fed through e.g. a wire guide as described herein to keep plural cables e.g. proximate to each other and at least partially out of view of a user when in front of the display device.

Before concluding, it is to be understood that although e.g. a software application for undertaking present principles (e.g. electronically moving a display device with respect to its stand using a motor) may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave and/or a signal per se.

While the particular DISPLAY STAND is herein shown and described in detail, it is to be understood that the subject matter which is encompassed by the present application is limited only by the claims.

What is claimed is:

1. A stand, comprising:
   a base supportable on a surface;
   a support rod having a long segment extending upwardly from the base and a short segment extending laterally away from the long segment and terminating at a free end, the long segment being longer than the short segment; and
   a coupling located at the free end of the short segment which couples the short segment to a computer chassis to establish a clearance space between the short segment, long segment, and chassis to facilitate access to at least one electrical terminal on the chassis below the coupling, the coupling comprising a hollow fitting oriented transverse to the short segment and which fits between left and right ring mounts on the chassis.

2. The stand of claim 1, therein the stand comprises one and only one support rod.

3. The stand of claim 1, wherein the base has a flat planar bottom surface.

4. The stand of claim 1, wherein the base has a flat planar top surface.

5. The stand of claim 1, wherein the support rod is oriented at an oblique angle with respect to the surface when the base is placed flat on the surface.

6. The stand of claim 1, wherein the short segment is unitarily made with the long segment and the coupling is unitarily made with the short segment.

7. The stand of claim 1, comprising at least one coupling pin which extends at least partially through the ring mounts and hollow fitting to hold the hollow fitting in engagement with the ring mounts to establish a rotatable hinge.

8. The stand of claim 1, comprising a wire guide engaged with the long segment and forming an enclosure through which at least one wire from the chassis can be fed to hold a portion of the wire within the enclosure.

9. The stand of claim 8, wherein the wire guide is slidably disposed on the long segment.

10. The stand of claim 8, wherein the wire guide comprises an engagement socket which closely receives the long segment in an interference fit and an enclosure portion establishing the enclosure, the enclosure being elongated in a horizontal dimension when the base is disposed flat on the surface.

11. The stand of claim 10, wherein the enclosure is completely enclosed in that the wire once fed through the enclosure cannot pass laterally through the enclosure portion.

12. An apparatus, comprising:
    a base; and
    an arm coupled to a face of the base, wherein the arm is coupled to the face to protrude outwardly therefrom at a first oblique angle relative to the face, the arm comprising a first segment which is elongated and defined at opposing ends by a first end coupled to the base and a second end at which the arm bends a second oblique angle relative to the first segment, the arm comprising a second segment defined at opposing ends by the second end and a third segment which is coupled to the second segment and which establishes a first axis which is at least substantially orthogonal to a second axis established by the second segment, the third segment structured for coupling to a display device and comprising a hollow fitting oriented transverse to the second segment which fits between left and right mounts on the display device.

13. The apparatus of claim 12, wherein the third segment comprises at least a first hinge element for engagement with a second hinge element coupled to a display device for hingedly coupling the third segment to the display device.

14. The apparatus of claim 13, wherein the first hinge element is structured for engagement with the second hinge element for rotation of the display device about an axis of rotation selected from the group consisting of: parallel to the first axis, established by the first axis.

15. The apparatus of claim 13, wherein the first segment, second segment, and third segment are structured to collectively establish a clearance space, when coupled to the display device, between the first segment, second segment, and display device to facilitate access to at least one port on the display device at least substantially below the second hinge element on a side of the display device at which the second hinge element is at least partially disposed.

16. The apparatus of claim 12, wherein the first segment, second segment, and third segment are cylindrical and integral, and wherein the first segment, second segment, and third segment are comprised of metal.

17. The apparatus of claim 16, wherein the first segment, second segment, and third segment are respectively comprised of a same diameter in the range of nine millimeters to eleven millimeters, wherein the second segment is structured to establish an unobstructed distance between a nearest portion of the display device to the second end of the first segment and at least the second end of the first segment of at least fifty five millimeters when the third segment is coupled to the display device, and wherein the base is at least partially cylindrical.

18. A method, comprising:
    providing a base for a display stand; and
    providing an arm emanating from the base which is structured to connect, via a coupling coupled to the arm, to a back of a display device above a portion of the back of the display device at which at least one port is located, the arm structured to avoid blocking a connector from being engaged with the port when the arm is connected to the back of the display device;
    wherein the coupling comprising a hollow fitting oriented transverse to a portion of the arm to which the coupling is coupled and which fits between left and right mounts on the display device.

19. The method of claim 18, further comprising:
    providing the display device;
    wherein the port is arranged on the back of the display device at least substantially in the middle of a dimension of the back of the display device established by the width of the display device.

* * * * *